US011663293B2

(12) United States Patent
Gao et al.

(10) Patent No.: US 11,663,293 B2
(45) Date of Patent: May 30, 2023

(54) IMAGE PROCESSING METHOD AND DEVICE, AND COMPUTER-READABLE STORAGE MEDIUM

(71) Applicant: SENSETIME GROUP LIMITED, Hong Kong (CN)

(72) Inventors: Yunhe Gao, Hong Kong (CN); Rui Huang, Hong Kong (CN); Zhiqiang Hu, Hong Kong (CN); Hongsheng Li, Hong Kong (CN)

(73) Assignee: SENSETIME GROUP LIMITED, Hong Kong (CN)

( * ) Notice: Subject to any disclaimer, the term of this patent is extended or adjusted under 35 U.S.C. 154(b) by 246 days.

(21) Appl. No.: 17/107,005

(22) Filed: Nov. 30, 2020

(65) Prior Publication Data

US 2022/0036124 A1    Feb. 3, 2022

(30) Foreign Application Priority Data

Jul. 31, 2020    (CN) .......................... 202010761819.5

(51) Int. Cl.
*G06K 9/00*        (2022.01)
*G06F 18/213*      (2023.01)
(Continued)

(52) U.S. Cl.
CPC ............. *G06F 18/213* (2023.01); *G06N 3/08* (2013.01); *G06T 7/136* (2017.01); *G06T 2207/20081* (2013.01); *G06T 2207/20084* (2013.01)

(58) Field of Classification Search
CPC ...... G06K 9/6232; G06N 3/08; G06N 3/0454; G06N 3/088; G06T 7/136;
(Continued)

(56) References Cited

U.S. PATENT DOCUMENTS

2021/0312674 A1 * 10/2021 Abrol ..................... G06N 20/00

FOREIGN PATENT DOCUMENTS

CN        110503654 A  * 11/2019   ............... G06T 7/11
CN        110910343 A  *  3/2020
WO     WO-2020183230 A1 *  9/2020   ........... A61B 5/7267

OTHER PUBLICATIONS

"Atlas-Based Delineation of Lymph Node Levels in Head and Neck Computed Tomography Images"; Feb. 2008; Olivier Commowick, Vincent Gregoire and Gregoire Malandain; Radiotherapy and Oncology, vol. 87, Issue 2, 18 pgs.

(Continued)

*Primary Examiner* — Xin Jia
(74) *Attorney, Agent, or Firm* — Cooper Legal Group, LLC

(57) ABSTRACT

The disclosure provides an image processing method and device, a computer-readable storage medium. The method includes: performing feature extraction on an image to be processed through a primary image segmentation model to obtain a feature map of the image to be processed; and performing image segmentation on a segmentation target according to the feature map through a target image segmentation model to obtain a target segmentation result, herein the target image segmentation model is obtained from an adversarial training with an image encoding model, and the image encoding model is used for placing a shape constraint on the target segmentation result. The disclosure may improve an accuracy of the image segmentation.

20 Claims, 15 Drawing Sheets

(51) Int. Cl.
*G06T 7/136* (2017.01)
*G06N 3/08* (2023.01)

(58) Field of Classification Search
CPC . G06T 2207/20081; G06T 2207/20084; G06T 2207/10081; G06T 2207/30004; G06T 7/11; G06T 7/187; G06T 2207/20016; G06V 10/46; G06V 10/82
See application file for complete search history.

(56) References Cited

OTHER PUBLICATIONS

"Segmentation of Organs-At-Risks in Head and Neck CT Images using Convolutional Neural Networks"; Feb. 2017: Bulat Ibragimov and Lei Xing; Medical physics, vol. 44, Issue 2, 21 pgs.

"Interleaved 3D-CNNs for Joint Segmentation of Small-Volume Structures in Head and Neck CT images"; May 2018, Xuhua Ren, Lei Xiang, Dong Nie, Yegin Shao, Huan Zhang, Duggang Shen and Qian Wang; Medical physics, vol. 45, issue 5, 42 pgs.

"U-net: Convolutional Networks for Biomedical Image Segmentation"; May 2015; Olaf Ronneberger, Philipp Fischer and Thomas Brox; Computer Science,Computer Vision and Pattern Recognition, 8 pgs.

"Squeeze-and-Excitation Networks"; May 2019; Jie Hu, Li Shen, Samuei Albanie, Gang Sun and Enhua Wu; Computer Science,Computer Vision and Pattern Recognition, 13 pgs.

"AnatomyNet: Deep Learning for Fast and Fully Automated Whole-Volume Segmentation of Head and Neck Anatomy"; Nov. 2018; Wentao Zhu, Yufang Huang, Liang Zeng, Xuming Chen, Yong Liu, Zhen Qian, Nan Du and Wei Fan, The International Journal of Medical Physics Research and Practice, vol. 46, Issue 2, 13 pgs.

FocusNetv2: Imbalanced Large and Small Organ Segmentation with Adversarial Shape Constraint for Head and Neck CT Images; Jan. 2020; Yunhe Gao, Ming Chen, Rui Huang, Yuanyuan Chen, Yiwei Yang, Jie Zhang, Chanjuan Tao, Dimitris N. Metasas and Hongsheng Li, Medical Image Analysis, 14 pgs.

* cited by examiner

IMAGE PROCESSING METHOD AND DEVICE, AND COMPUTER-READABLE STORAGE MEDIUM

CROSS-REFERENCE TO RELATED APPLICATION

The present application claims benefit of Chinese Application No. 202010761819.5, filed on Jul. 31, 2020, the contents of which are hereby incorporated by reference in its entirety.

TECHNICAL FIELD

The disclosure relates to the field of image processing technology, and particularly to, an image processing method and device, and a computer-readable storage medium.

BACKGROUND

Up-to-date depth learning segmentation algorithms only involve pixel-level segmentation based on image features without taking shapes of segmentation results into consideration, which brings outliers into the segmentation results. For example, when image segmentation is performed on an organ at risk in a medical image, the shape of the organ predicted by the up-to-date depth learning segmentation algorithm is inconsistent with prior medical knowledge. For example, an optic chiasma has an X-shaped anatomical structure, but at present most depth learning networks that use a cross-entropy loss function or a Dice loss function may predict that the optic chiasma has a smooth shape similar to an ellipsis. As a result, the image segmentation result does not conform to the prior knowledge, thereby lowering the accuracy of the image segmentation.

SUMMARY

The embodiments of the disclosure are intended to provide an image processing method and device, and a computer-readable storage medium that are able to improve an accuracy of image segmentation.

An image processing method is provided in an embodiment of the disclosure, the method including: performing feature extraction on an image to be processed through a primary image segmentation model to obtain a feature map of the image to be processed; performing image segmentation on a segmentation target according to the feature map through a target image segmentation model to obtain a target segmentation result, herein the target image segmentation model is obtained from an adversarial training with an image encoding model, and the image encoding model is used for placing a shape constraint on the target segmentation result.

An image processing device is provided in an embodiment of the disclosure. The image processing device includes a memory storing processor-executable instructions; and a processor arranged to execute the stored processor-executable instructions to perform operations of: performing feature extraction on an image to be processed to obtain a feature map of the image to be processed; and performing image segmentation on a segmentation target according to the feature map to obtain a target segmentation result, wherein the target image segmentation model is obtained from an adversarial training with an image encoding model, and the image encoding model is used for placing a shape constraint on the target segmentation result.

A non-transitory computer-readable storage medium is provided in an embodiment of the disclosure. The non-transitory computer-readable storage medium has stored thereon computer-readable instructions that, when executed by a processor, cause the processor to perform an image processing method, the method including: performing feature extraction on an image to be processed to obtain a feature map of the image to be processed; and performing image segmentation on a segmentation target according to the feature map to obtain a target segmentation result, wherein the target image segmentation model is obtained from an adversarial training with an image encoding model, and the image encoding model is used for placing a shape constraint on the target segmentation result.

DETAILED DESCRIPTION

The technical solutions of the embodiments of the disclosure are described below clearly and completely in combination with the accompanying drawings of the embodiments of the disclosure.

At present, an accurate image segmentation method needs to take upwards of 20 organs at risk into consideration especially in clinical radiotherapy planning of the medical field. The method usually requires a doctor to plot on a Computed Tomography (CT) image based on his/her prior medical knowledge but plotting on the three-dimensional (3D) CT image is always laborious. It takes a professional doctor more than 2 and a half hours to plot a patient's organs because of a complex anatomical structure of the head and neck. Different doctors may plot a patient's organ differently due to the influence of subjective factors. In addition, due to the fact that the CT is not sensitive to soft tissues, many organs are not in stark contrast with surrounding tissues and the boundaries between the organs and their surrounding tissues are not clear, thus a segmentation algorithm may produce an erroneous segmentation result.

Therefore, a fast, efficient, high-performance, robust computer assisted segmentation algorithm may ease a doctor's work significantly, accelerate and enhance the radiotherapy planning and makes the radiotherapy more effective.

Up-to-date depth learning segmentation algorithms only involve pixel-level segmentation based on image features without taking shapes of segmentation results into consideration, which brings outliers into the segmentation results. For example, when image segmentation is performed on an organ at risk in a medical image, the shape of the organ predicted by the up-to-date depth learning segmentation algorithm is inconsistent with prior medical knowledge. For example, an optic chiasma has an X-shaped anatomical structure, but at present most depth learning networks that use a cross-entropy loss function or a Dice loss function may predict that the optic chiasma has a smooth shape similar to an ellipsis. As a result, the image segmentation result does not conform to the prior knowledge, thereby lowering the accuracy of the image segmentation.

Figure 1:
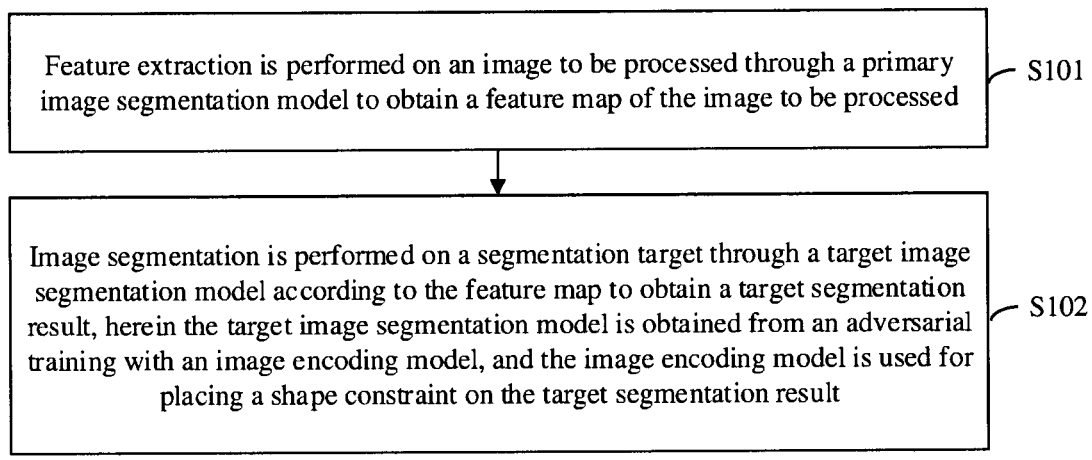
FIG. 1 is a first schematic flowchart of an image processing method provided in an embodiment of the disclosure.

FIG. 1 is an optional schematic flowchart of a method provided in an embodiment of the disclosure. Descriptions are to be given based on operations illustrated in FIG. 1.

In operation S101, feature extraction is performed on an image to be processed through a primary image segmentation model to obtain a feature map of the image to be processed.

The image processing method provided in the embodiment of the disclosure is applicable to an image segmentation scenario such as medical image segmentation, picture effects processing and other scenarios in need of the image segmentation, but the disclosure is not limited thereto.

In the embodiment of the disclosure, an image processing device may perform the feature extraction on the image to be processed through the primary image segmentation model to obtain the feature map of the image to be processed. The primary image segmentation model is a trained neural network model, and is used to recognize a feature of each pixel in the image to be processed, and to label a recognition result, which is typically a probability that each pixel falls into a certain category, on the pixel, so as to obtain the feature map of the image to be processed.

In the embodiment of the disclosure, the primary image segmentation model may use a relevant feature extracting technique to extract the feature map of the image to be processed. For example, the feature map of the image to be processed may be extracted based on an artificially designed feature such as a local brightness feature of an image, an organ shape feature.

In some embodiments, the image to be processed may be a medical image including organs at risk. The primary image segmentation model may be a modified 3D U-Net fully convolutional neural network that is based on an encoder-decoder architecture. The model can be used to learn multi-scale features of the medical image. The image processing device inputs the medical image such as an original CT image into the primary image segmentation model, and a tensor of a probability that each pixel is included in each organ is outputted by the primary image segmentation model.

In the embodiment of the disclosure, the primary image segmentation model may be used to output a segmentation result of a large segmentation target with a clear boundary, such as a large organ in the CT image.

In the embodiment of the disclosure, in order to improve an accuracy in segmentation performed by the primary image segmentation model, the image processing device may use a residue block including a convolution layer, an ReLU and a batch normalization layer as a backbone network of the primary image segmentation model. Furthermore, a squeeze-and-excitation (SE) module is further added into the device to serve as an attention mechanism of feature level. Furthermore, down-sampling is only performed twice in the primary image segmentation model in order to reduce detail loss evoked by the down-sampling.

In the embodiment of the disclosure, in order to learn the multi-scale features, the image processing device may use a Densely connected Atrous Spatial Pyramid Pooling (DenseASPP) as a network architecture of the primary image segmentation model.

Figure 2:
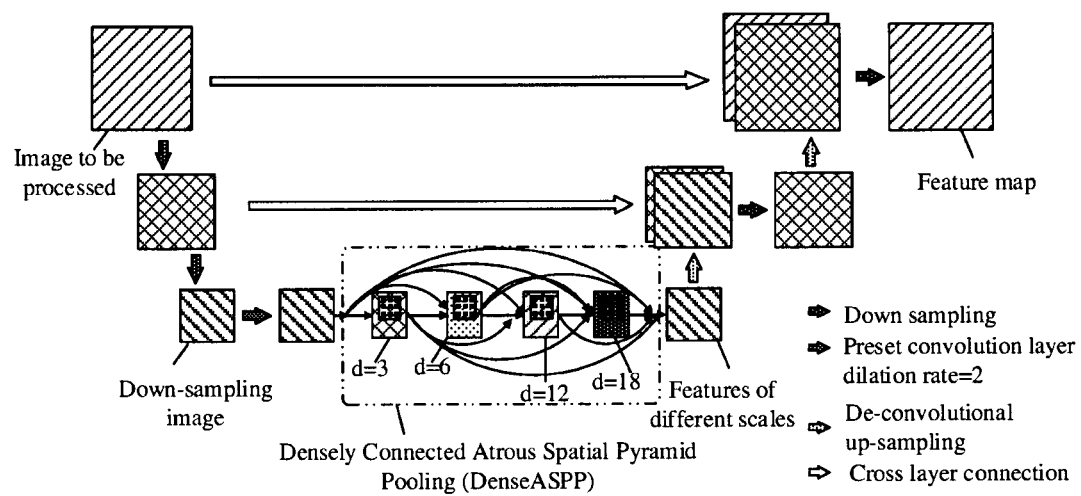
FIG. 2 is a schematic structural diagram of a primary image segmentation model provided in an embodiment of the disclosure

In some embodiments, the network architecture of the primary image segmentation model may be illustrated in FIG. 2. In FIG. 2, the primary image segmentation model firstly performs the down-sampling on the inputted image to be processed twice to obtain a smaller down-sampled image and then performs convolution on the down-sampled image once with a dilation rate d preset to 2, thereby enlarging a receptive field of the down-sampled image. In addition, the primary image segmentation model learns features of the down-sampled image that vary in scale based on different convolution layer dilation rates d such as 3, 6, 12 or 18 preset in the DenseASPP. It can be seen that the greater the preset convolution layer dilation rate is, the greater the scale of the feature that the primary image segmentation model can learn. The primary segmentation model performs de-convolutional up-sampling on the features of different scales that the model learns; the model fuses each feature that has been subjected to the up-sampling with a feature of a same scale through a cross layer connection; then the model performs the same up-sampling and the same fusion again and finally obtains the feature map extracted from the image to be processed. The above operations enables the primary image segmentation model to capture, learn and fuse the features of different scales by presetting the convolution layer dilation rate, so that a convolutional kernel receptive field large enough is ensured and a feature expression ability of the primary image segmentation model is enhanced.

In operation S102, image segmentation is performed on the segmentation target through a target image segmentation model according to the feature map to obtain a target segmentation result. The target image segmentation model is obtained from an adversarial training with an image encoding model, and the image encoding model is used for placing a shape constraint on the target segmentation result.

In the embodiment of the disclosure, the image processing device may recognize the required segmentation target from the feature map through the target image segmentation model according to the obtained feature map, and perform the image segmentation to obtain the target segmentation result.

In the embodiment of the disclosure, the target image segmentation model is a neural network model obtained from the adversarial training with the image encoding model.

In the embodiment of the disclosure, since it is difficult for a shape of the segmentation target to be described by numbers in a quantitative manner, the image processing device may encode a shape of a labeled segmentation target in a training sample image through the image encoding model in the adversarial training phase, so that a shape of the labeled segmentation target is represented by in the form of a code. A shape boundary of the labeled segmentation target in the training sample image may be plotted artificially according the prior knowledge. Thus, for some segmentation targets in actual images have blurry boundaries, according to the shapes of the segmentation targets in the prior knowledge learned by the image encoding model, the image encoding model places the shape constraint on the target segmentation result outputted by the target image segmentation model that is subjected to the adversarial training together with the image encoding model. Therefore, the target segmentation result outputted by the target image segmentation model is made to accord with the prior knowledge.

In the embodiment of the disclosure, the image encoding model may be subjected to the adversarial training in conjunction with the target image segmentation model. In the adversarial training, minimizing a similarity degree loss function between a network-predicted shape and a ground truth shape is used as an objective function of an initial target image segmentation model, and maximizing the similarity degree loss function between the network-predicted shape and the ground truth shape is used as an objective function of an initial image encoding model. Therefore, after the adversarial training, the initial image encoding model may better capture a difference between the network-predicted shape and the ground truth shape and provides a more effective supervision signal to the initial target image segmentation model. When the initial target image segmentation model makes it impossible for the initial image encoding model to determine whether an input is a network-predicted shape or a ground truth labeled shape, it can be believed that the adversarial training's goal is attained, and the trained image encoding model and the trained target image segmentation model are obtained. In this way, when the target image segmentation model is used to perform the image segmentation, the shape constraint learned by the target image segmentation model in the adversarial training may be used to improve an accuracy of the target segmentation result; in this way, the target image segmentation model is made to perform the segmentation more accurately.

It can be understood that since the target image segmentation model learns the shape constraint on the segmentation target during the adversarial training with the image encoding model, a more accurate target segmentation result may be obtained and the image segmentation is performed more accurately.

Figure 3:
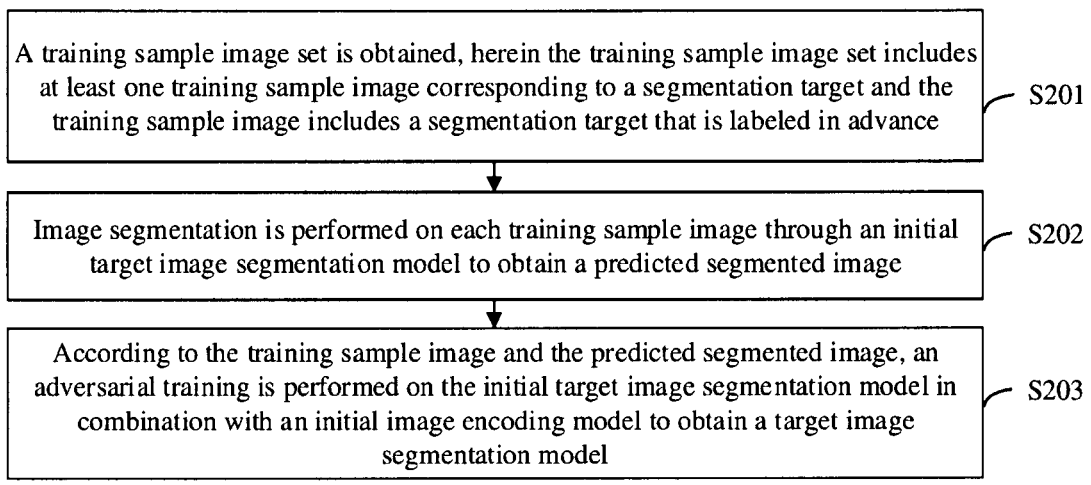
FIG. 3 is a second schematic flowchart of an image processing method provided in an embodiment of the disclosure.

In the embodiment of the disclosure, as to the adversarial training undergone by the target image segmentation model and the image encoding model, as illustrated in FIG. 3, the method includes operations S201 to S203 that are performed before operation S102.

In operation S201, a training sample image set is obtained. The training sample image set includes at least one training sample image corresponding to the segmentation target, and the training sample image has a segmentation target that is labeled in advance.

In operation S202, the image segmentation is performed on each training sample image through an initial target image segmentation model to obtain a predicted segmented image.

In the embodiment of the disclosure, an image processing device may establish the initial target image segmentation model. Weights of network parameters on each layer of the initial target image segmentation model are initial values. In a round of training, the image processing device performs the image segmentation on one training sample image in the training sample image set through the initial target image segmentation model to obtain the predicted segmented image, then adversarial training of the initial target image segmentation model starts.

In operation 203, according to the labeled segmentation target and the predicted segmented image, the adversarial training is performed on the initial target image segmentation model in combination with an initial image encoding model to obtain the target image segmentation model.

In the embodiment of the disclosure, the predicted segmented image represents a result of the image segmentation that is performed through the initial target image segmentation model. The image processing device may compare the predicted segmented image and the labeled segmentation target in the training sample image so as to ascertain a training effect of each round of training of the initial target image segmentation model. Before a next round of training starts, network weights on each layer of the initial target image segmentation model are updated according to a shape constraint placed by the initial image encoding model so that the predicted segmented image outputted by the initial target image segmentation model in the next round of training may be more similar to the labeled segmentation target. The image processing device continues the above iterative training until the image encoding model is not able to distinguish the predicted segmented image from the labeled segmentation target. When the image encoding model is not able to distinguish the predicted segmented image from the labeled segmentation target, the image processing device believes that a preset target is attained in the training, and then stops the iterative training obtains a target image segmentation model.

In the embodiment of the disclosure, a main function of the image encoding model is to make every effort to capture a difference between the predicted segmented image and the labeled segmentation target. If the image encoding model is able to distinguish the predicted segmented image and the labeled segmentation target, the next round of training is still required, that is because an accuracy of the image segmentation performed by the initial target image segmentation model has not met a requirement put forth in a preset training objective. Therefore, the image encoding model may supervise the training performed on the initial target image segmentation model. In order to strengthen an ability of the image encoding model to capture the difference between the predicted segmented image and the labeled segmentation target, the image encoding model may firstly make use of the initial image encoding model to begin to undergo the adversarial training in conjunction with an initial target image encoding model. In the adversarial training, the image encoding model and the initial target image encoding model take turns updating their respective network model parameters. When the preset training objective is attained, the target image encoding model is obtained.

Figure 4:
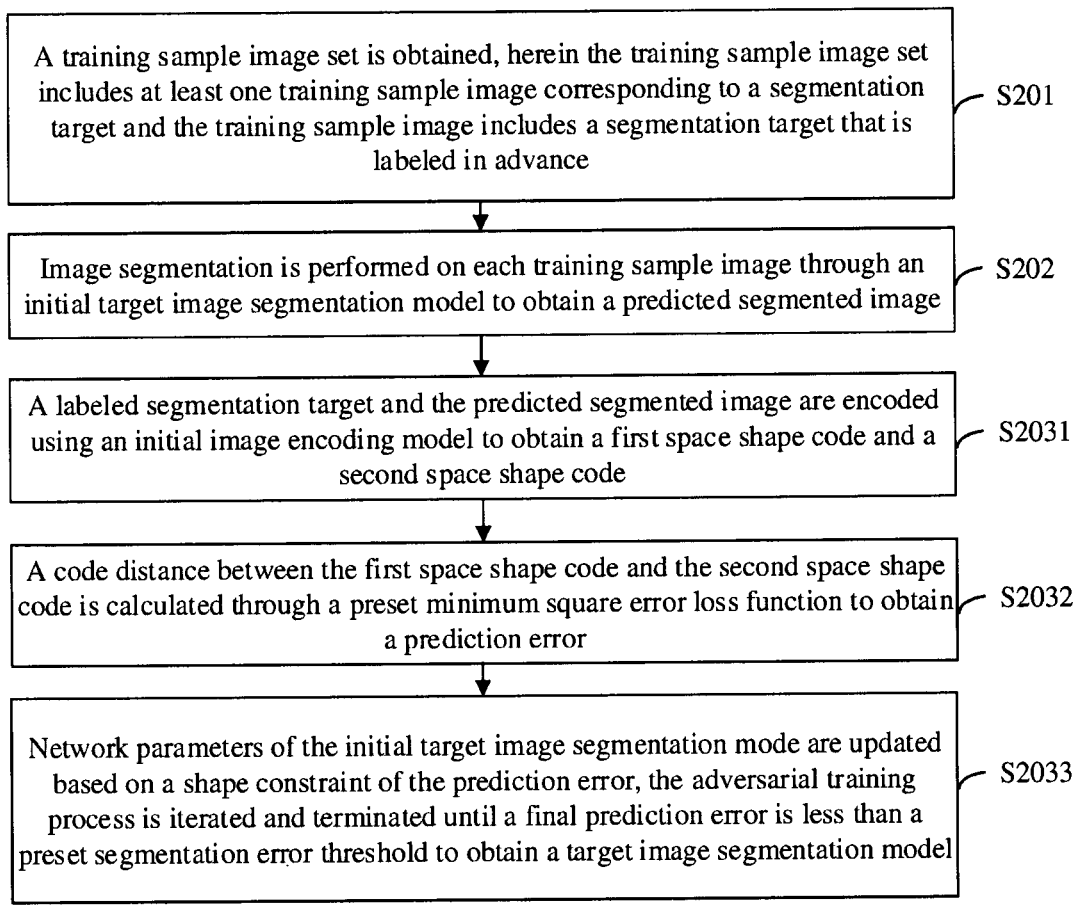
FIG. 4 is a third schematic flowchart of an image processing method provided in an embodiment of the disclosure.

In the embodiment of the disclosure, as illustrated in FIG. 4, operation S203 illustrated in FIG. 3 may be implemented through operations S2031 to S2033. Descriptions of the implementation are given in combination with the operations.

In operation S2031, a labeled segmentation target and a predicted segmented image are encoded using an initial image encoding model to obtain a first space shape code and a second space shape code. The first space shape code is a low-dimensional manifold space representation of the labeled segmentation target and the second space shape code is a low-dimensional manifold space representation of the predicted segmented image.

In the embodiment of the disclosure, in order to make a shape of the segmentation target that is labeled in advance and a shape of a segmentation result included in the predicted segmented image more accurately represented, an image processing device may first encode the labeled segmentation target in a sample image using the initial image encoding model to obtain the first space shape code, and then encode the predicted segmentation image using the initial image encoding model to obtain the second space shape code.

In the embodiment of the disclosure, the initial image encoding model includes an encoding sub-model. The encoding sub-model includes at least one convolution layer and a fully connected layer. The encoding sub-model may squeeze the training sample image and the predicted segmented image through the at least one convolution layer according to a preset step size of the at least one convolution layer and encode the labeled segmentation target in the squeezed training sample image and the squeezed predicted segmented image through the fully connected layer so that the first space shape code and the second space shape code are obtained.

In the embodiment of the disclosure, when the sample images are inputted into the initial image encoding model, the low-dimensional manifold representation of the shape of the labeled segmentation target is outputted by the initial image encoding model. In this case the initial image encoding model may learn a potential space representation of the shape of the labeled segmentation target in the training. In some embodiments, when the sample image is a medical image including artificially labeled organs at risk, shapes of the artificially labeled organs at risk may be learned in the initial image encoding model; the shapes of the organs at risks in the prior knowledge are used as a constraint on the shape of the predicted segmented image outputted by the initial image encoding model, so that the shape constraint is incorporated into the learning and the training of the initial image encoding model.

In operation S2032, a code distance between the first space shape code and the second space shape code is calculated through a preset minimum square error loss function to obtain a prediction error.

In the embodiment of the disclosure, since the first space shape code is able to represent the shape of the labeled segmentation target and the second space shape code is able to represent the shape of the predicted segmented image, the image processing device may calculate the code distance between the first space shape code and the second space shape code through the preset minimum square error loss function and determine the code distance as the prediction error. The code distance is used to represent a distance between the predicted segmented image outputted by the initial target image segmentation model and the labeled segmentation target.

In the embodiment of the disclosure, the preset minimum square error loss function may be expressed in a formula (1) below:

$$\min_{G} \max_{D} L_{shape} = E_{x \sim p_{data}, y \sim p_{gt}} \|D_{latent}(y) - D_{latent}(G(x))\|_2^2. \quad (1)$$

In the formula (1), x is the sample image, $p_{data}$ is a distribution function of the sample image, y is the labeled segmentation target, $p_{gt}$ is a distribution function of the labeled segmentation target, D is the initial image encoding model, G is the initial target image segmentation model, G(x) is the predicted segmented image, $D_{latent}(y)$ is the first space shape code, $D_{latent}(G(x))$ is the second space shape code, and $L_{shape}$ is the prediction error. In the training, the initial image encoding model needs to maximize the distance between the first space shape code and the second space shape code through the formula (1) to discriminate the difference between the predicted segmented image and the labeled segmentation target to the greatest extent, whereas the initial target image segmentation model needs to minimize the distance between the first space shape code and the second space shape code through the formula (1) so that the initial image coding model is unable to distinguish the predicted segmented image from the labeled segmentation target in the adversarial training, so as to attain the preset training objective.

In operation S2033, network parameters of the initial target image segmentation mode are updated based on the shape constraint of the prediction error, the adversarial training process is iterated and terminated until a final prediction error is less than a preset segmentation error threshold to obtain the target image segmentation model.

In the embodiment of the disclosure, since the prediction error represents the difference between the predicted segmented image and the labeled segmentation target, the image processing device may adjust the step size based on the shape constraint of the prediction error when updating the network parameters of the initial target image segmentation model. The image processing device iterates the training in the above manner until the final prediction error is less than the preset segmentation error threshold. When the final prediction error is less than the preset segmentation error threshold, the predicted segmented image approximates the labeled segmentation target, which means an accuracy of the image segmentation performed by the initial target image segmentation model has reached the preset training objective; at this time, the image processing device may terminate the training to obtain the target image segmentation model.

Figure 5:
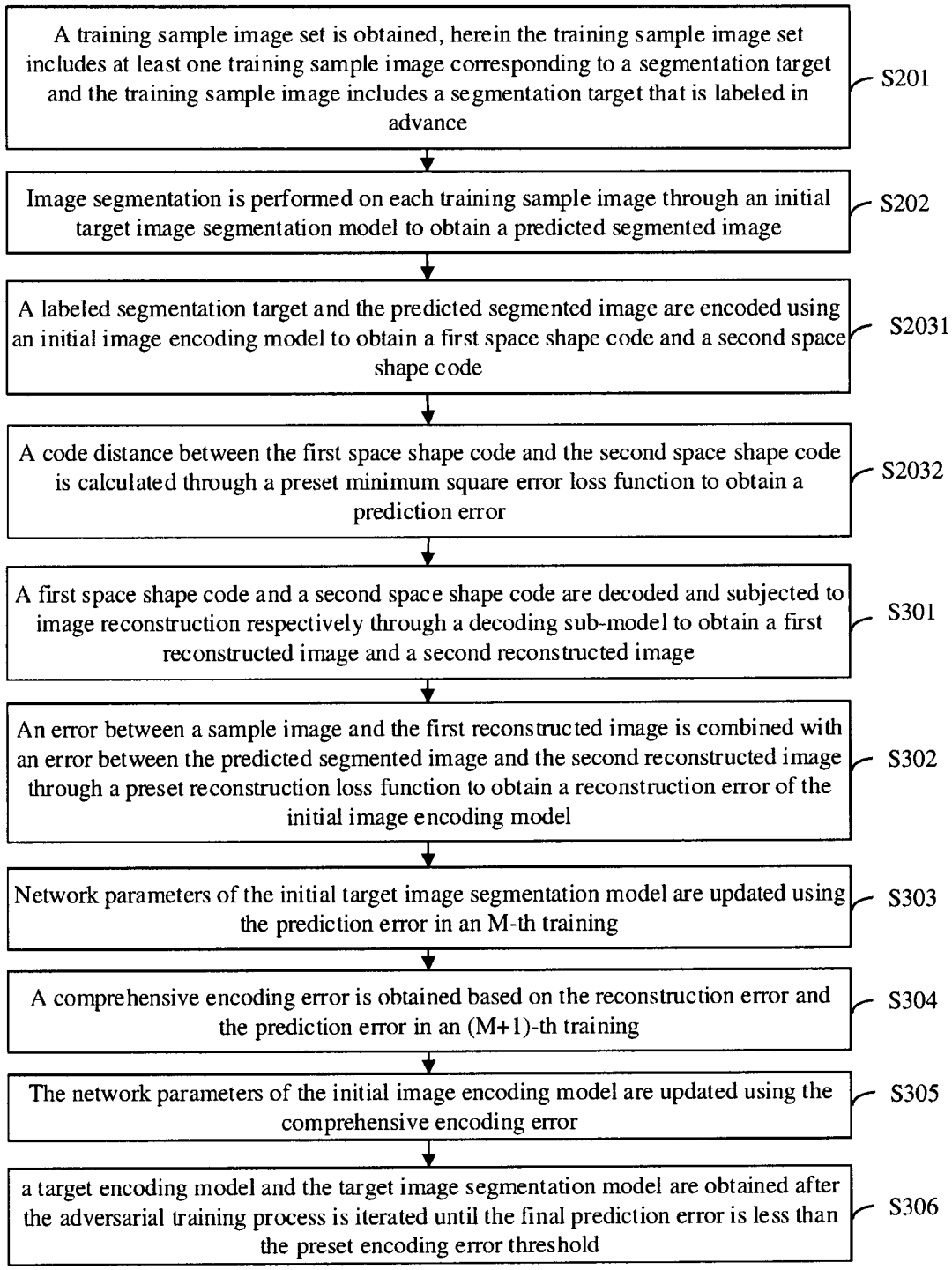
FIG. 5 is a fourth schematic flowchart of an image processing method provided in an embodiment of the disclosure.

In the embodiment of the disclosure, FIG. 5 may be referred to for the adversarial training performed on the image coding model. After operation S2032 illustrated in FIG. 4 is performed, operations S301 to S302 may also be performed. Descriptions are given below in combination with operations S301 to S302.

In operation S301, a first space shape code and a second space shape code are decoded and subjected to image reconstruction respectively through a decoding sub-model to obtain a first reconstructed image and a second reconstructed image.

In the embodiment of the disclosure, an initial image encoding model also includes the decoding sub-model. In order to strengthen an ability of the initial image encoding model to learn a shape feature of a labeled segmentation target, the image processing device may decode and perform the image reconstruction on the first space shape code and the second space shape code respectively to obtain the first reconstructed image and the second reconstructed image. The image processing device updates network parameters of the initial image encoding model by comparing the original labeled segmentation target and the first constructed image, and comparing the original predicted segmented image and the second reconstructed image, the first constructed image and the second reconstructed image being respectively obtained as a result of encoding and decoding the original labeled segmentation target and the original predicted segmented image. This makes the ability of the initial image encoding model to learn a shape of the labeled segmentation target gradually strengthened.

In the embodiment of the disclosure, the decoding sub-model includes at least one de-convolution layer, an ReLU and a batch normalization layer. Through the at least one de-convolution layer, the ReLU and the batch normalization layer in the decoding sub-model, the image processing device may reconstruct the labeled segmentation target corresponding to the first space shape code and reconstruct the predicted segmented image corresponding to the second space shape code in a potential space, so that the first constructed image and the second constructed image are obtained.

In the embodiment of the disclosure, the first reconstructed image is an image that is obtained after the initial image encoding model performs encoding/decoding reconstruction on the labeled segmentation target, and the second reconstructed image is an image that is obtained after the initial image encoding model performs encoding/decoding reconstruction on the predicted segmented image.

In operation S302, an error between the labeled segmentation target and the first reconstructed image is combined with an error between the predicted segmented image and the second reconstructed image through a preset reconstruction loss function to obtain a reconstruction error of the initial image encoding model.

In the embodiment of the disclosure, the image processing device may calculate the error between the labeled segmentation target and the first reconstructed image as well as the error between the predicted segmented image and the second reconstructed image; in addition, the image processing device combines the two errors to obtain the reconstruction error of the initial image encoding model.

In the embodiment of the disclosure, the preset reconstruction loss function may be expressed in a formula (2) below:

$$L_{rec} = |D(y)-y|_2^2 + |D(G(x))-G(x)|_2^2 \qquad (2).$$

In the formula (2), D(y) is the first reconstructed image, D(G(x)) is the second reconstructed image and $L_{rec}$ is the reconstruction error. The image processing device calculates the error between the labeled segmentation target and the first reconstructed image and the error between the predicted segmented image and the second reconstructed image respectively using the formula (2); and obtains the reconstruction error by adding the two errors together.

In the embodiment of the disclosure, as illustrated in FIG. 5, operation S2033 illustrated in FIG. 4 may be implemented by operations S303 to S306. Descriptions are given below in combination with operations S303 to S306.

In operation S303, network parameters of the initial target image segmentation model are updated using the prediction error in an M-th training, where M is an integer greater than or equal to 1.

In the embodiment of the disclosure, in an actual adversarial training, the network parameters are updated alternately. The image processing device may firstly update the network parameters of the initial target image segmentation model and then the initial target image segmentation model using the updated network parameters may undergo a next round of training. The image processing device updates the network parameters of the initial image encoding model according to a result of the next round of training.

In the embodiment of the disclosure, as to the M-th training, the image processing device may make use of the prediction error to update the network parameters of the initial target image segmentation model according to a preset optimization function corresponding to the initial target image segmentation model. M is an integer greater than or equal to 1.

In the embodiment of the disclosure, the preset optimization function corresponding to the initial target image segmentation model may be expressed in a formula (3) below:

$$\min_{G} L_G = L_{seg} + \lambda_1 L_{shape}, \qquad (3)$$

and $$L_{seg} = -L_{focal} + \lambda L_{dice}. \qquad (4)$$

In the formula (3), $\lambda_1$ is a balancing factor used for balancing two losses: the prediction error $L_{shape}$ and a segmentation error $L_{seg}$. The balancing factor may be set to 5 according to experience. The segmentation error $L_{seg}$ is a loss function of a primary image segmentation model and may be obtained through the formula (4). The image processing device may update the network parameters of the initial target image segmentation model through the formula (3) to minimize a sum $L_G$ of the prediction error and the segmentation error so that the predicted segmented image outputted by the initial target image segmentation model in the next round of training, namely an (M+1)th training, is made to be more similar to the labeled segmentation target.

In the formula (4), $L_{focal}$ is a focal loss function, which is used when the primary image segmentation model is trained. The function is used to increase a weight of a sample that is mistakenly determined in the training and plays a focusing role. $L_{dice}$ is a generalized dice loss function used for training the primary image segmentation model. $\lambda$ is a weight for balancing proportions of the two losses to a total loss. In some embodiments, $\lambda$ may be equal to 1.

In operation S304, a comprehensive encoding error is obtained based on the reconstruction error and the prediction error in the (M+1)-th training.

In operation S305, the network parameters of the initial image encoding model are updated using the comprehensive encoding error.

In the embodiment of the disclosure, after updating the network parameters of the initial image segmentation model, the image processing device begins the (M+1)th training. In the (M+1)th training, based on the reconstruction error and the prediction error calculated in this round of training, the image processing device obtains the comprehensive encoding error according to the preset optimization function corresponding to the initial image encoding model and updates the network parameters of the initial image encoding model using the comprehensive encoding error.

In the embodiment of the disclosure, the preset optimization function corresponding to the initial image encoding model may be expressed in a formula (5) below:

$$\max_{D} \; L_D = -L_{rec} + \lambda_2 L_{shape}. \quad (5)$$

In the formula (5), $\lambda_2$ is a hyperparameter. Since the predicted segmented image outputted by the initial target image segmentation model may gradually become more similar to the labeled segmentation target during the training the initial target image segmentation model undergoes, if the initial image encoding model is not able to effectively distinguish the predicted segmented image from the labeled segmentation target, the initial image encoding model is not able to effectively supervise the training performed on the target image segmentation model. Introduction of the hyperparameter may increase the difference between the predicted segmented image and the labeled segmentation target properly and is conducive to enhancement an effect of the adversarial training. In some embodiments, $\lambda_2$ is usually set to a value that is no greater than 0.0001 as larger $\lambda_2$ may increase the instability of the training. $L_D$ is the comprehensive encoding error that represents the difference between the prediction error and the reconstruction error. The image processing device adjusts the network parameters of the initial image segmentation model using the formula (5) to maximize the comprehensive error $L_D$. After two consecutive adversarial training, the image processing device respectively finishes updating the network parameters of the initial target image segmentation model and the network parameters of the initial image segmentation model.

Figure 6:
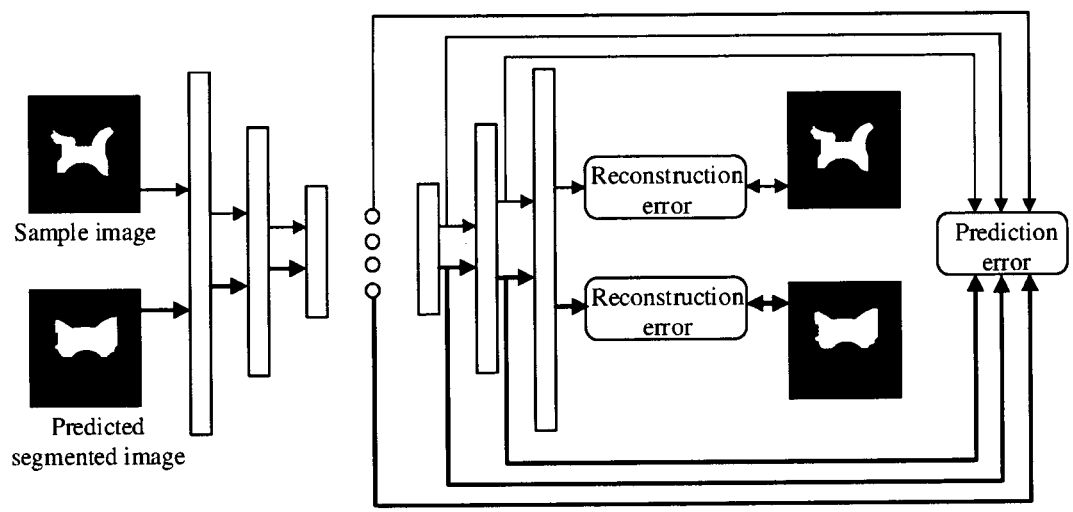
FIG. 6 is a schematic diagram of a training process of an image encoding model provided in an embodiment of the disclosure.

In some embodiments, the adversarial training of the initial image encoding model may be illustrated in FIG. 6. In FIG. 6, the initial image encoding model respectively encodes a labeled segmentation target and a predicted segmentation image to obtain a first space shape code and a second space shape code. The initial image encoding model obtains the reconstruction error by performing the method in operation S302 and obtains the prediction error by performing the method in operation S2032. The initial image encoding model obtains the comprehensive encoding error using the formula (5) based on the reconstruction error and the prediction error in order to update its network parameters.

In operation S306, a target encoding model and the target image segmentation model are obtained after the adversarial training process is iterated until the final prediction error is less than the preset encoding error threshold.

In the embodiment of the disclosure, the image processing device iterates the above adversarial training until the prediction error obtained in the final round of the training is less than the preset encoding error threshold. After the adversarial training is terminated, the target encoding model and the target image segmentation model are obtained.

It can be understood that in the embodiment of the disclosure, when the target image segmentation model is trained, the image processing device uses an image encoding model to impose a shape constraint on a prediction result of the target image segmentation model. Therefore, the target image segmentation model is able to input shape code into a potential space and make the shape predicted by a network accord with the prior knowledge by minimizing a distance between the shape predicted by the network and a ground truth shape. The target image segmentation model constrains the predicted result of the target image segmentation model so that an accuracy of the image segmentation is improved.

Figure 7:
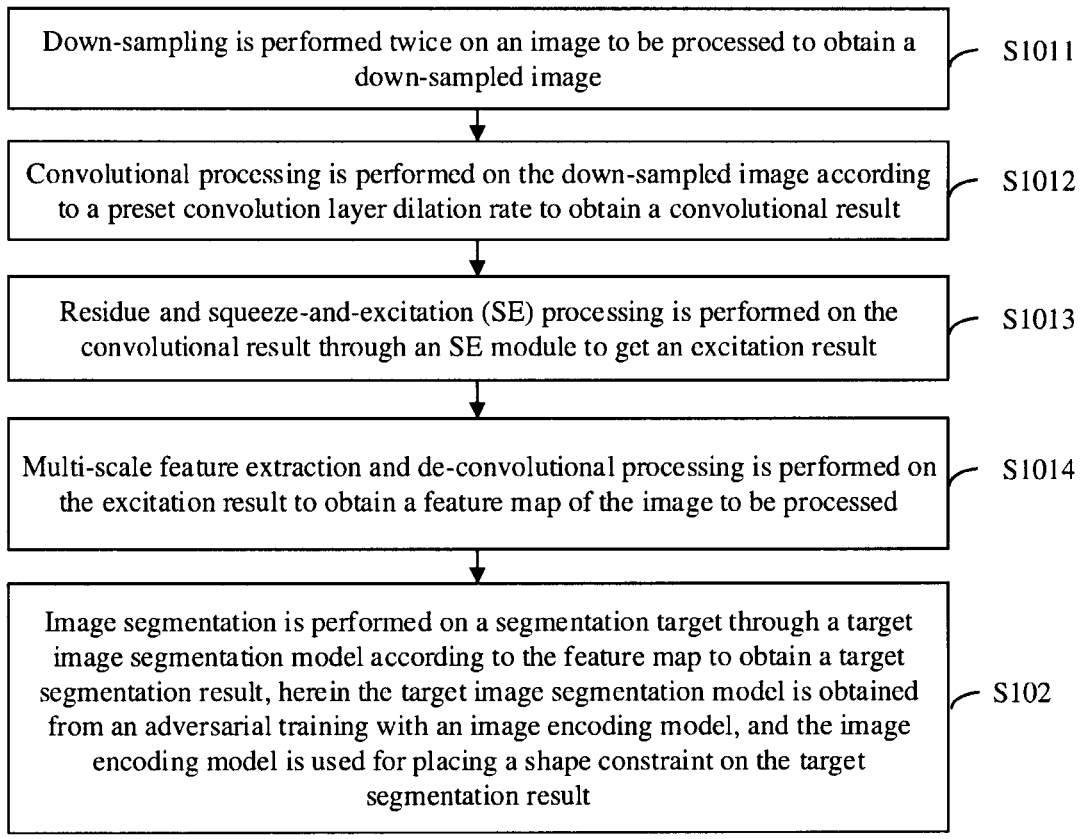
FIG. 7 is a fifth schematic flowchart of an image processing method provided in an embodiment of the disclosure.

In the embodiment of the disclosure, a primary image segmentation model includes an SE module. As illustrated in FIG. 7, operation S101 illustrated in FIG. 1 may be implemented by operations S1011-S1014. Descriptions are given below in combination with operations S1011-S1014.

In operation S1011, down-sampling is performed on an image to be processed twice to obtain a down-sampled image.

In the embodiment of the disclosure, in order to reduce a detail loss incurred by the down-sampling, when using the primary image segmentation model to perform feature extraction, an image processing device only performs the down-sampling twice in the primary image segmentation model to obtain the down-sampled image.

In the embodiment of the disclosure, since the image segmentation model reduces a number of times of the down-sampling, loss of high-resolution information is reduced in the down-sampled image.

In operation S1012, convolutional processing is performed on the down-sampled image according to a preset convolution layer dilation rate to obtain a convolutional result.

In the embodiment of the disclosure, according to the preset convolution layer dilation rate, the image processing device may use the DenseASPP in the primary image segmentation model illustrated in FIG. 2 to perform the convolutional processing on the down-sampled image to obtain the convolutional result.

In some embodiments, the de-convolutional up-sampling may also be implemented using trilinear differential up-sampling. How the de-convolutional up-sampling is implemented depends on an actual situation but the disclosure is not limited thereto.

In operation S1013, residue and SE processing is performed on the convolutional result through the SE module to get an excitation result.

In operation S1014, multi-scale feature extraction and de-convolutional processing is performed on the excitation result to obtain a feature map of the image to be processed.

In the embodiment of the disclosure, in order to strengthen a feature expression ability of a network, the image processing device further adds the SE module into the primary image segmentation model where a residue module is a basic structure and makes the SE module serve as an attention mechanism on a feature layer. The image processing device may perform the residue processing and the SE processing on the convolutional result through the SE module to obtain the excitation result; then the image processing device performs the multi-scale feature extraction on the excitation result through the DenseASPP, and finally performs de-convolutional processing to obtain the feature map of the image to be processed.

It can be understood that in the embodiment of the disclosure, because of the DenseASPP and the SE module that is added into the primary image segmentation model, the primary image segmentation model strengthens feature expression ability of the network and performs the feature extraction more accurately, which makes the image processing device perform image segmentation more accurately.

Figure 9:
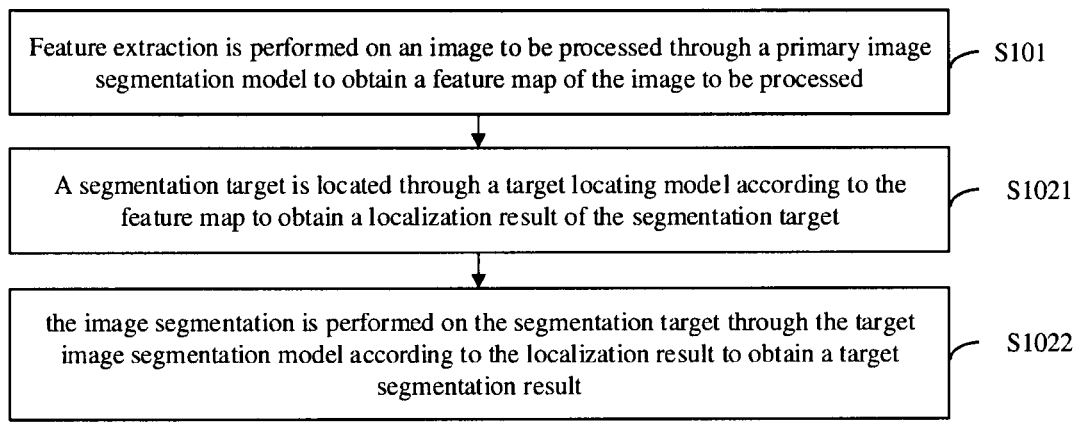
FIG. 9 is a sixth schematic flowchart of an image processing method provided in an embodiment of the disclosure.

In the embodiment of the disclosure, as illustrated in FIG. 9, operation S102 illustrated in FIG. 1 may be implemented through operations S1021 to S1022. Descriptions are given below in combination with operations S1021 to S1022.

In operation S1021, a segmentation target is located through a target locating model according to the feature map to obtain a localization result of the segmentation target.

At present, an image to be processed includes many target images varying in size. For example, a CT image includes many organs that are at risk and in different sizes. A large organ such as a parotid gland is more than 250 times as large as a crystalline lens, the smallest organ. A serious imbalance in samples may happen to a smaller segmentation target, which reduces an accuracy of segmentation. Therefore, an image processing device in the embodiment of the disclosure may use a two-phase network that firstly locates and then segments: firstly, feature recognition and normalization processing is performed on a feature map that is on an N-th layer and is outputted by a primary image segmentation model to obtain a probability that each pixel in the N-th layer of feature map is in a center location of the segmentation target so that the segmentation target is located; and then based on the probability that each pixel is in the center location of the segmentation target, the image segmentation is performed on the feature map that is on the N-th layer through a target image segmentation model so that the localization result of the segmentation target is obtained.

In the embodiment of the disclosure, the localization result of the segmentation target includes a feature map region of the segmentation target. The image processing device may specifically perform further image segmentation on the segmentation target based on the localization result of the segmentation target.

In some embodiments, when the primary image segmentation model outputs the N-th layer of feature map to the CT image, the image processing device may perform feature processing on the N-th layer of feature map through 2 SE modules in the target locating module and then normalize a calculation result to an interval ranging from 0 to 1 through an S-type excitation function (Sigmoid) layer so that a probability map of a center location of each small organ in the CT image is outputted. For image regions for which probabilities of the small organ center locations are within a range, the image processing device crops the image regions out from the N-th layer of feature map according to the probability map of each small organ center location, and determines the image regions as the localization result of the segmentation target.

Figure 8:
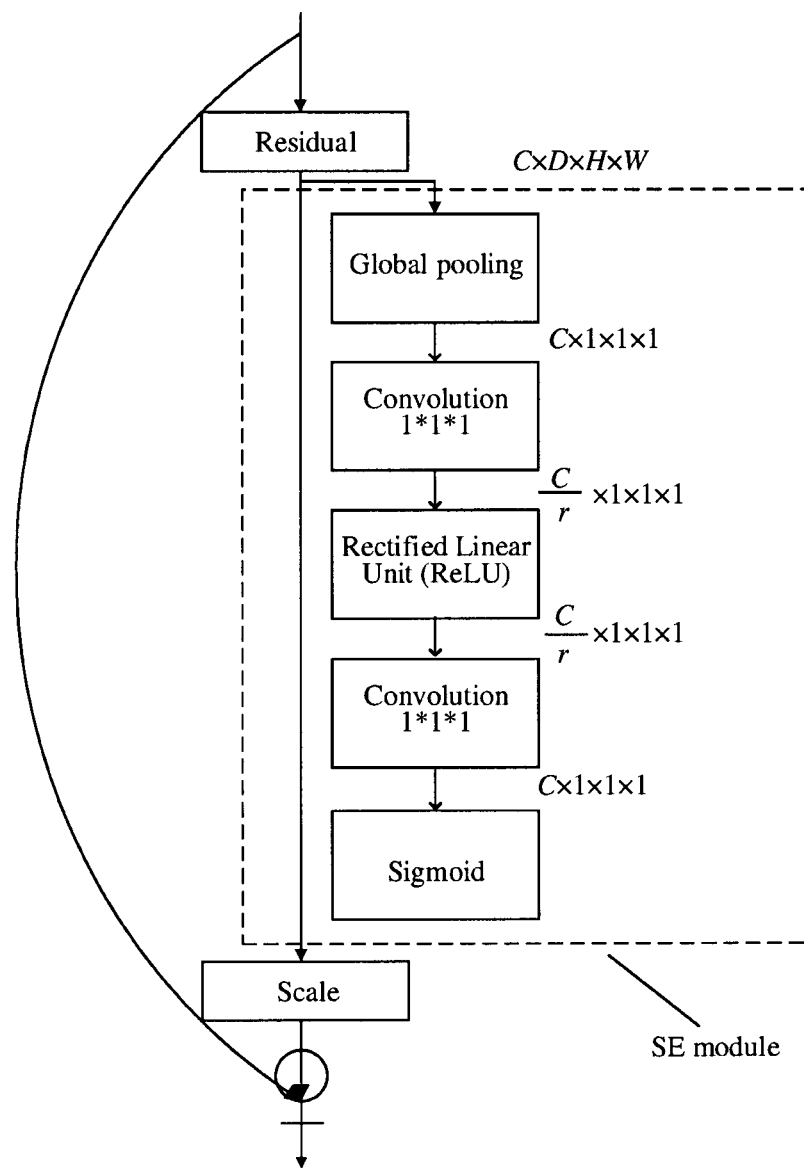
FIG. 8 is a schematic structural diagram of an SE model provided in an embodiment of the disclosure.

In some embodiments, a structure of the SE module may be illustrated in FIG. 8. An existing convolution layer network block directly enters a scale block after a residue block. In order to enable features of different strengths to be learned at different depths, a method of the convolution layer network block in the embodiment of the disclosure introduces the SE module after a residue block to improve an attention mechanism of the network. Specifically speaking, the SE module may include a global pooling layer, the convolution layer, an ReLU layer and the Sigmoid layer. In FIG. 8, C is a number of channels of the convolution, D is a depth of the feature map, H is a height of the feature map and W is a width of the feature map. After the feature map enters the SE module through the residue block, the feature map is shrunk to 1*1*1 through global pooling and the shrunk feature map is subjected to the convolution through the convolution layer; the number of the channels is decreased by a factor of r to activate the feature map; then the activation result is subjected to the convolution and Sigmoid function activation once and a result outputted by the Sigmoid module is outputted by a scale block. After the above SE module performs processing, a convolution network module may concentrate on learning more important features of the feature map, which makes the image segmentation more accurate.

In operation S1022, the image segmentation is performed on the segmentation target through the target image segmentation model according to the localization result to obtain the target segmentation result.

In the embodiment of the disclosure, according to the localization result the image processing device may predict a shape of the segmentation target through the target image segmentation module to obtain a cropping range of the segmentation target; the image processing device finds out a corresponding region in the high-resolution feature map on the N-th layer according to the localization result and the cropping range of the segmentation target and performs cropping processing on the N-th layer of feature map to obtain the target segmentation result.

It can be understood that in the embodiment of the disclosure, the image processing device may locate a smaller segmentation target first and finely segments the parts cropped out from the feature map, thereby solving the problem that the samples of the small segmentation targets are imbalanced, and making the image segmentation easier and more accurate. Since the target image segmentation model places the shape constraint in the training, shape prediction made through the target image segmentation model becomes more accurate and an accuracy of the image segmentation is further improved.

Figure 10:
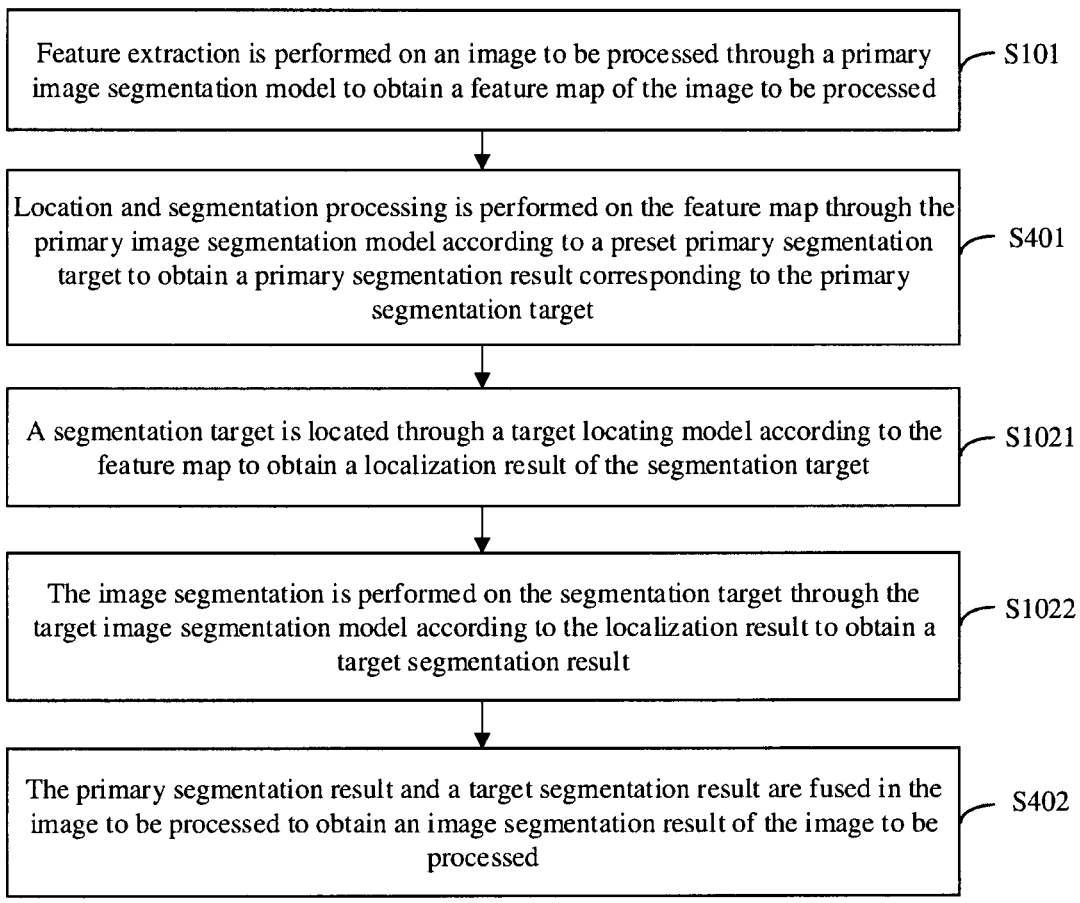
FIG. 10 is a seventh schematic flowchart of an image processing method provided in an embodiment of the disclosure.

In the embodiment of the disclosure, as illustrated in FIG. 10, after operation S101 illustrated in FIG. 9 is performed, operations S401 and S1022 may be performed and finally operation S402 may also be performed. Descriptions are given below in combination with all the operations.

In operation S401, location and segmentation processing is performed on a feature map through a primary image segmentation model according to a preset primary segmentation target to obtain a primary segmentation result corresponding to the primary segmentation target.

In the embodiment of the disclosure, since the feature map outputted by the primary image segmentation model is a map of a probability that each pixel is zin each kind of segmentation target, for primary segmentation targets with a relatively large volume and a clear boundary, the feature map outputted by the primary image segmentation model may directly be located and subjected to the segmentation processing to obtain the primary segmentation result corresponding to the primary segmentation target.

In operation S402, the primary segmentation result and a target segmentation result are fused in the image to be processed to obtain an image segmentation result of the image to be processed.

In the embodiment of the disclosure, in the image to be processed, the image processing device may fuse the primary segmentation result that is obtained after segmentation performed through the primary image segmentation model and the target segmentation result that is obtained after segmentation performed through a target image segmentation model and finally obtains the image segmentation result of the image to be processed that may embody multiple segmentation targets.

In some embodiments, the primary segmentation result may be a segmentation result of a large organ in a CT image, and the target segmentation result may be a segmentation result of a small organ in the CT image. The image processing device fuses the primary segmentation result and the target segmentation result to obtain the image segmentation result of the image to be processed that includes the segmentation result of the large organ and the segmentation result of the small organ.

An exemplary application of an embodiment of the disclosure in an actual application scenario is described below.

Figure 11:
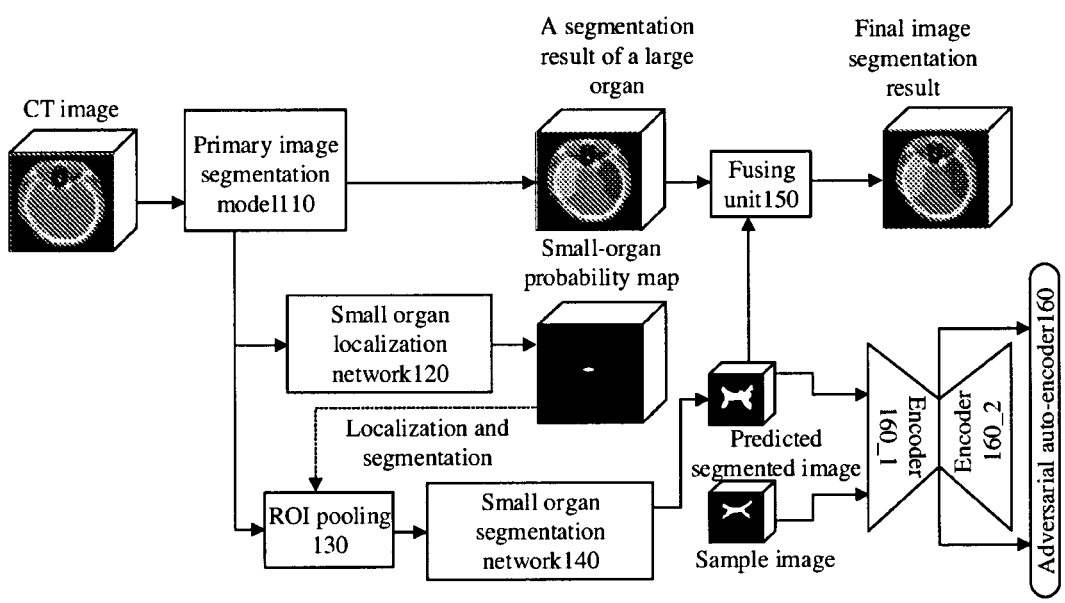
FIG. 11 is a schematic diagram of a network architecture of an image processing device provided in an embodiment of the disclosure.

In some embodiments, as illustrated in FIG. 11, a network architecture of an image processing device related to segmentation of a medical image is provided in the embodiment of the disclosure. In FIG. 11, a small organ segmentation network 140 is equivalent to a target image segmentation network. During a training of the small organ segmentation network 140, the image processing device may undergo an adversarial training together with the small segmentation network 140 through an adversarial auto-encoder 160. Specifically, a first space shape code and a second space shape code are obtained by encoding a predicted segmented image outputted by the small organ segmentation network 140 and a labeled segmentation target in a training sample image through an encoder 160_1 included in the adversarial auto-encoder 160. The encoder 160_1 is equivalent to an encoding sub-model and the training sample image includes the labeled segmentation target. The image processing device calculates a prediction error through the first space shape code and the second space shape code, and updates network parameters of the small organ segmentation network 140 through the prediction error. After the update, a round of training is finished. In a next round of training, the image processing device performs decoding reconstruction, through a decoder 160_2 included in the adversarial auto-encoder 160, the first space shape code and the second space shape code obtained in the current training to obtain a first reconstructed image and a second reconstructed image, herein the decoder 160_2 is equivalent to a decoding sub-module. The image processing device calculates a reconstruction error based on an error between the labeled segmentation target and the first reconstructed image and an error between the predicted segmented image and the second reconstructed image. The image processing device calculates a comprehensive encoding error through the reconstruction error and a prediction error obtained in the current training, and updates the network parameters of the adversarial encoder 160 through the comprehensive encoding error, so that the adversarial training of the small organ segmentation network 140 and the adversarial auto-encoder 160 undergo is implemented alternately. The image processing device iterates the above training, and terminates the adversarial training until the adversarial auto-encoder 160 is not able to distinguish the predicted segmented image outputted by the small organ segmentation network 140 from the labeled segmentation target, so as to obtain the trained small organ segmentation network 140.

During the application of the small organ segmentation network 140, the image processing device firstly performs feature extraction on an original CT image through a primary image segmentation model 110 to obtain a feature map and directly obtains a segmentation result of a large organ. The large organ is equivalent to a primary segmentation target and the segmentation result of the large organ is equivalent to a primary segmentation result. Later, based on an N-th layer of feature map in the feature map, the image processing device locates an image range of the small organ in the feature map through a small organ localization network 120 and segments the feature map into regions according to a located position to obtain a small-organ probability map. The small organ localization network 120 is equivalent to a target locating model and the small-organ probability map is equivalent to a localization result. In order to reduce a data dimension and improve a processing efficiency, the image processing device may perform Region Of Interest pooling (ROI pooling) on the small-organ probability map and segments, based on a position of the small organ in the small-organ probability map and a shape of the small organ predicted by the small organ segmentation network 140, the N-th layer of feature map in the feature map to obtain the segmentation result of the small organ that is equivalent to a target segmentation result. The image processing device fuses the segmentation result of the large organ and the segmentation result of the small organ through a fusing unit 150 to obtain a final image segmentation result that is equivalent to a segmentation result of an image to be processed.

Figure 12:
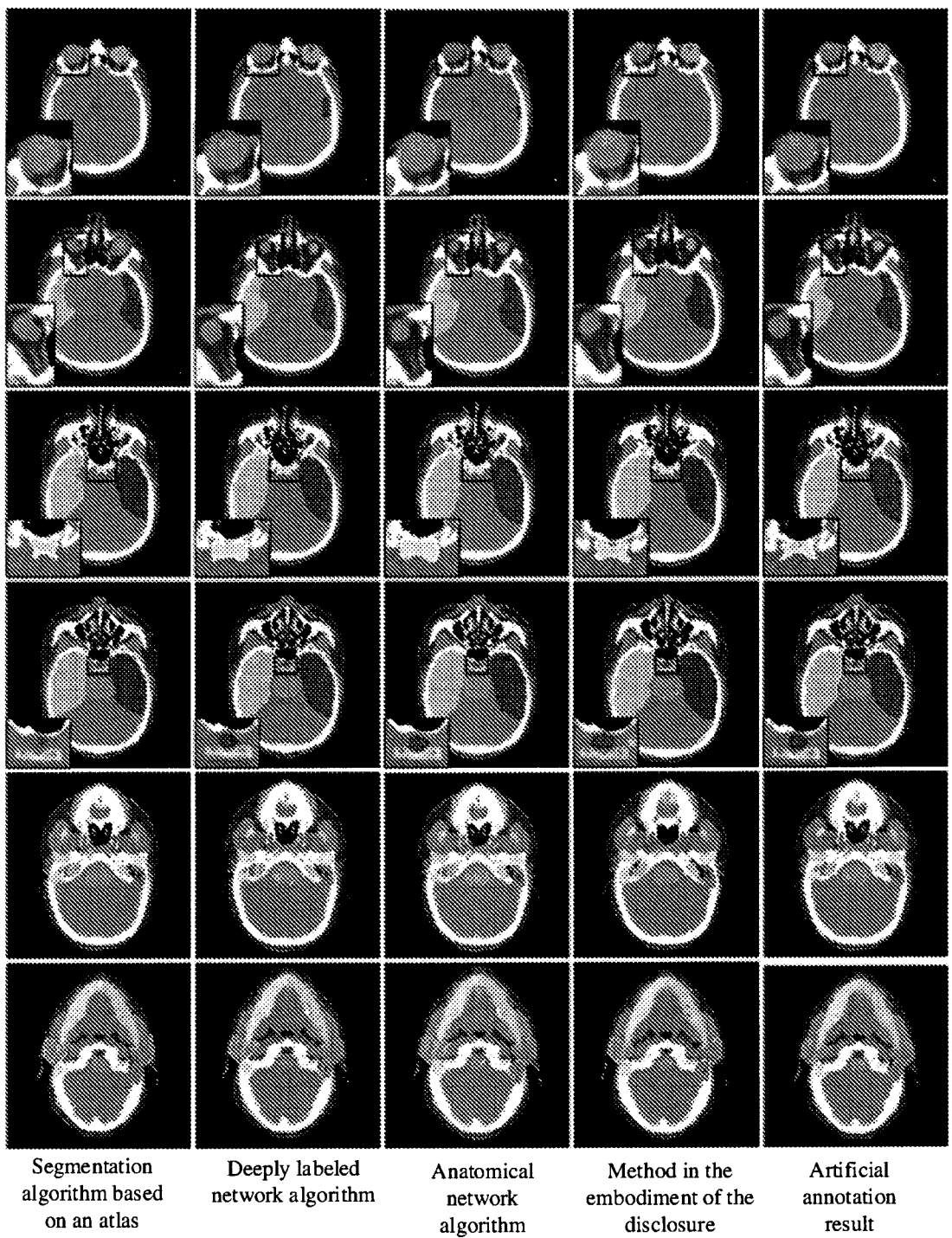
FIG. 12 is a first schematic diagram of an image segmentation effect of an image processing method provided in an embodiment of the disclosure.

In some embodiments, when the image processing method in the embodiment of the disclosure is performed to segment organs in the head CT image, an effect of a comparison between the CT image segmentation performed by the method, the CT image segmentation performed by a segmentation algorithm based on an atlas (a multi-Atlas algorithm), the CT image segmentation performed by a deeply labeled network DeepLav V3+ and the CT image segmentation performed by an anatomy network (AnatomyNet) may be illustrated in FIG. 12. It can be seen that the shape of the small organ that is obtained after segmented by the method in the embodiment of the disclosure is more similar to an artificial annotation result and the image segmentation is performed more accurately by the method of the embodiment of the disclosure.

Figure 13:
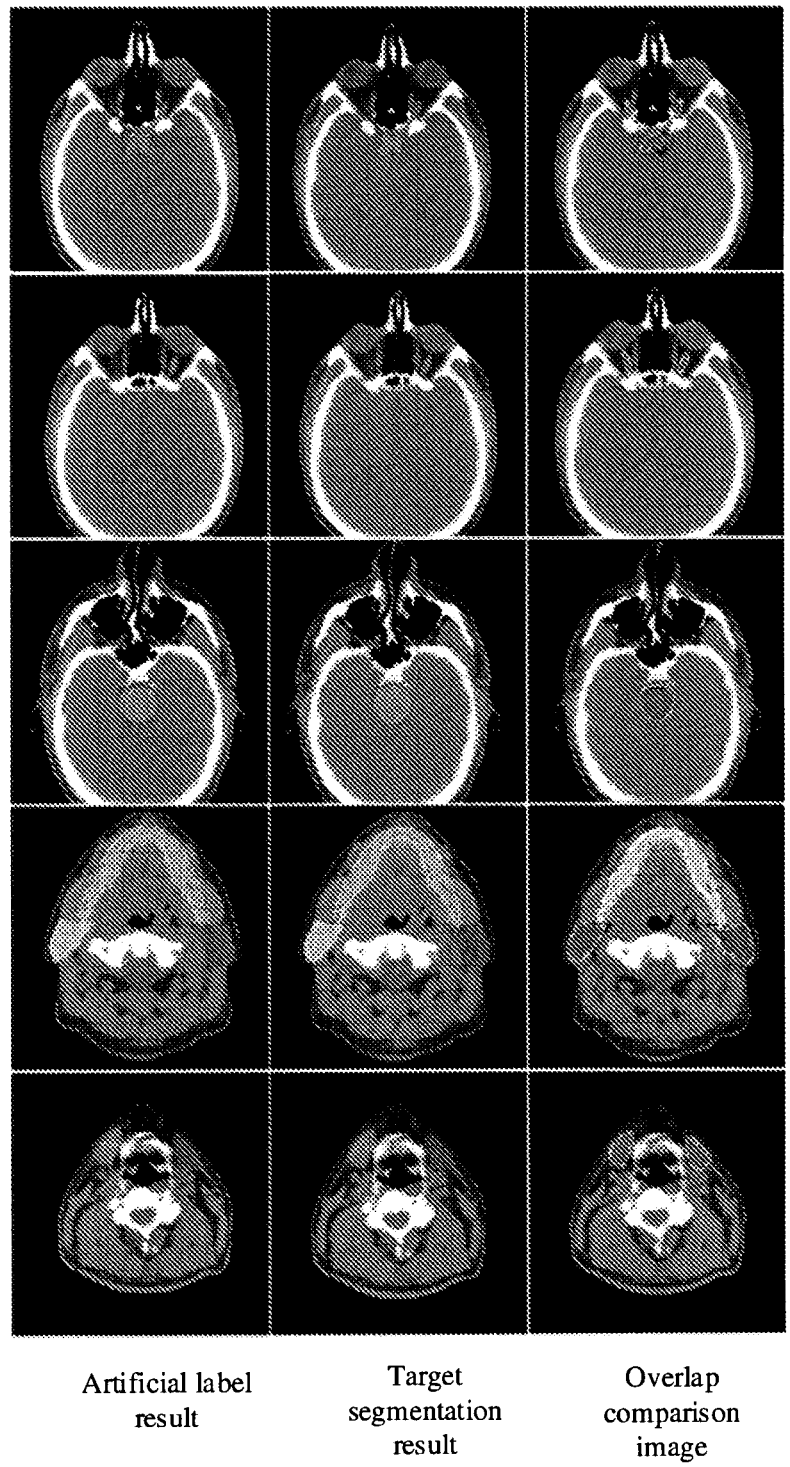
FIG. 13 is a second schematic diagram of an image segmentation effect of an image processing method provided in an embodiment of the disclosure.

In some embodiments, as illustrated in FIG. 13, comparison is made by superimposing the target segmentation result, which is obtained from the organ segmentation performed by the image processing method in the embodiment of the disclosure on the head CT image, on an image of the artificial annotation result. It can be seen that after the superimposition, the target segmentation result obtained in the embodiment of the disclosure has a great coincidence degree with the image of the artificial annotation result. In this way, a shape of the target segmentation result obtained in the embodiment of the disclosure is basically consistent with the artificial annotation result so that the image segmentation is performed with a great accuracy in the image processing method in the embodiment of the disclosure.

Figure 14:
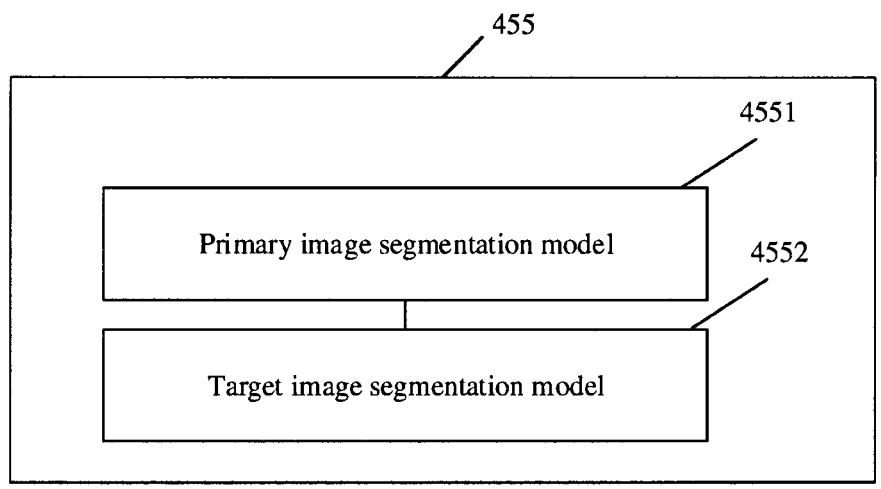
FIG. 14 is a first schematic structural diagram of an image processing device provided in an embodiment of the disclosure.

An image processing device is provided in an embodiment of the disclosure. FIG. 14 is a schematic structural diagram of an image processing device 455 provided in the embodiment of the disclosure. The image processing device 455 includes a primary image segmentation model 4551 and a target image segmentation model 4552.

The primary image segmentation model 4551 is configured to perform feature extraction on an image to be processed to obtain a feature map of the image to be processed.

The target image segmentation model 4552 is configured to perform image segmentation on a segmentation target according to the feature map to obtain a target segmentation result. The target image segmentation model is obtained from an adversarial training with an image encoding model, and the image encoding model is used for placing a shape constraint on the target segmentation result.

In some embodiments, the image processing device 455 further includes a training unit.

Before the image segmentation is performed on the segmentation target through the target image segmentation model according to the feature map to obtain the target segmentation result, the training unit is configured to: obtain a training sample image set, herein the training sample image set includes at least one training sample image corresponding to the segmentation target and the training sample image includes a labeled segmentation target; perform the image segmentation on each training sample image through an initial target image segmentation model to obtain a predicted segmented image; and perform the adversarial training on the initial target image segmentation model in combination with an initial image encoding model according to the labeled segmentation target and the predicted segmented image to obtain the target image segmentation model.

In some embodiments, the training unit is further configured to: encode the labeled segmentation target and the predicted segmented image using the initial image encoding model to obtain a first space shape code and a second space shape code, herein the first space shape code is a low-dimensional manifold space representation of the labeled segmentation target and the second space shape code is a low-dimensional manifold space representation of the predicted segmented images; calculate a code distance between the first space shape code and the second space shape code through a preset minimum square error loss function to obtain a prediction error; and update network parameters of the initial target image segmentation model based on a shape constraint of the prediction error, iterate the adversarial training process and terminate the adversarial training process until a final prediction error is less than a preset segmentation error threshold to obtain the target image segmentation model.

In some embodiments, the primary image encoding model includes a decoding sub-model. The training unit is further configured to: after the code distance between the first space shape code and the second space shape code is calculated through the preset minimum square error loss function to obtain the prediction error, decode and perform image reconstruction on the first space shape code and the second space shape code respectively through the decoding sub-model to obtain a first reconstructed image and a second reconstructed image; and combine, through a preset reconstruction loss function, an error between the labeled segmentation target and the first reconstructed image with an error between the predicted segmented image and the second reconstructed image to obtain a reconstruction error of the initial image encoding model.

In some embodiments, the training unit is further configured to: update the network parameters of the initial target image segmentation model using the prediction error in an M-th training, herein M is an integer greater than or equal to 1; obtain a comprehensive encoding error based on the reconstruction error and the prediction error in an (M+1)-th training; update the network parameters of the initial image encoding model using the comprehensive encoding error; and iterate the above adversarial training until the final prediction error is less than the preset encoding error threshold and obtain a target encoding model and the target image segmentation model.

In some embodiments, the primary image encoding model includes an encoding sub-model. The encoding sub-model includes at least one convolution layer and a fully connected layer. The training unit is further configured to squeeze the training sample image and the predicted segmented image through the at least one convolution layer according to a preset step size of the at least one convolution layer and encode the labeled segmentation target in a squeezed training sample image and a squeezed predicted segmented image through the fully connected layer to obtain the first space shape code and the second space shape code.

In some embodiments, the decoding sub-model includes at least one de-convolution layer, an ReLU and a batch normalization layer.

In some embodiments, the image processing device 455 further includes a target locating model. The target locating model is configured to: locate the segmentation target according to the feature map to obtain a localization result; and perform the image segmentation on the segmentation target through the target image segmentation model 4552 according to the localization result to obtain the target segmentation result.

In some embodiments, the primary image segmentation model 4551 includes an SE module. The primary image segmentation model 4551 is further configured to: perform down-sampling on the image to be processed twice to obtain a down-sampled image; perform convolutional processing on the down-sampled image according to a preset convolutional layer dilation rate to obtain a convolutional result; perform residue and SE processing on the convolutional result through the SE module to obtain an excitation result; and performing multi-scale feature extraction and de-convolutional processing on the excitation result to obtain the feature map of the image to be processed.

In some embodiments, the feature map includes N layers of feature maps, and N is an integer greater than 1. The target locating model is further configured to: perform feature recognition and normalization processing on an N-th layer of feature map to obtain a probability that each pixel in the N-th layer of feature map is in a center location of the segmentation target; and perform the image segmentation on the N-th layer of feature map according to the probability to obtain the localization result of the segmentation target.

In some embodiments, the target locating model is further configured to: predict a shape of the segmentation target through the target image segmentation model to obtain a cropping range of the segmentation target; and perform cropping processing on the N-th layer of feature map according to the localization result of the segmentation target and the cropping range to obtain the target segmentation result.

In some embodiments, after performing the feature extraction on the image to be processed through the primary image segmentation model to obtain the feature map of the image to be processed, the primary image segmentation model 4551 is further configured to perform location and segmentation processing on the feature map according to a preset primary segmentation target to obtain a primary segmentation result corresponding to the primary segmentation target.

The image processing device 455 further includes a fusing unit. The fusing unit is configured to, after the target image segmentation model performs the image segmentation on the segmentation target according to the localization result to obtain the target segmentation result, fuse the primary segmentation result and the target segmentation result in the image to be processed to obtain an image segmentation result of the image to be processed.

It should be noted that the descriptions of the above device embodiments are similar to the descriptions of the above method embodiments. The device embodiments and the method embodiments also have similar beneficial effects. The technical details that are not disclosed by the device embodiments of the disclosure can be understood with reference to the descriptions of the method embodiments of the disclosure.

It should be noted that in the embodiment of the disclosure, the above image processing method can be stored in a computer-readable storage medium if implemented in a form of the software function module and sold or used as a separate product. Based on such an understanding, an essential part of the technical solutions in the embodiment of the disclosure, or a part of the technical solutions in the embodiment of the disclosure making contributions to the prior art may be embodied in a form of a software product. The computer software product is stored in a storage medium and includes several instructions configured to enable a computer device (which may be a terminal, a server, or the like) to execute all or a part of the method in each embodiment of the disclosure. The above-mentioned storage medium includes: various media capable of storing program codes such as a U disk, a mobile hard disk, a Read-Only Memory (ROM), a magnetic disk and an optical disk. Thus, any specific combination of hardware and software is not limited in the embodiments of the disclosure.

Accordingly, a computer program product is also provided in an embodiment of the disclosure. The computer program product includes computer-executable instructions that are used to implement the operations of the image processing method provided in the embodiments of the disclosure.

Accordingly, a computer-readable storage medium is also provided in an embodiment of the disclosure. A computer program that is used to implement the operations of the image processing method provided in the above embodiments is stored in the computer-readable storage medium.

An image processing method and device, and a computer-readable storage medium are provided in the embodiments of the disclosure. Since an image encoding model may place a shape constraint on a target segmentation result, a target image segmentation model obtained from an adversarial training with the image encoding model is able to learn an accurate shape of a segmentation target. In this way, the image processing device may obtain a more accurate target segmentation result when using the target image segmentation model to perform image segmentation on the segmentation target, thereby improving the accuracy of image segmentation.

Figure 15:
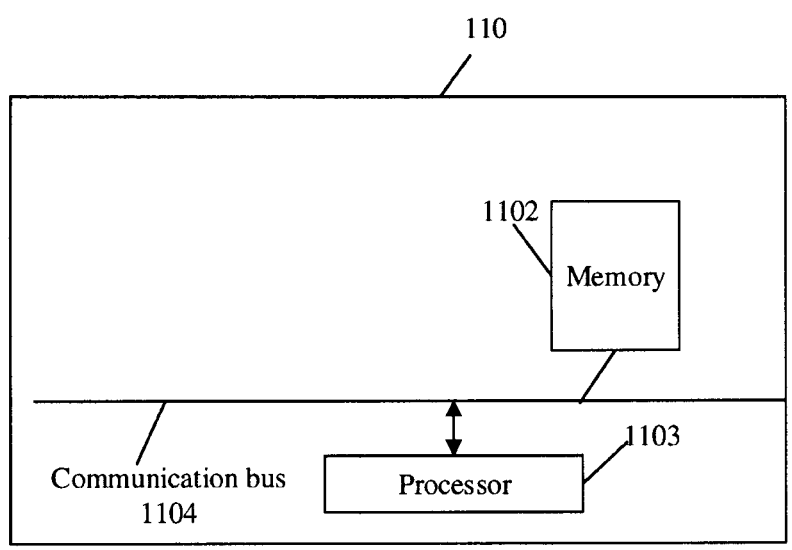
FIG. 15 is a second schematic structural diagram of an image processing device provided in an embodiment of the disclosure.

An image processing device is also provided in an embodiment of the disclosure. FIG. 15 is a schematic diagram of an optional structure of the image processing device. As illustrated in FIG. 15, the image processing device 110 includes:

a memory 1102, configured to store a computer program;

a processor 1103, configured to implement the operations of the image processing method provided in the above embodiments when executing the computer program stored in the memory 1102.

The image processing device 110 further includes: a communication bus 1104 configured to implement a connection and communication between these components.

In the embodiment of the disclosure, the memory 1102 is configured to store the computer program and applications executed by the processor 1103, and also make use of a flash memory or an RAM to cache data (such as image data, audio data, voice communication data and video communication data) that will be processed by or have been processed by each module in the processor 1103.

The processor 1103 implements the operations of any of the above image processing methods when executing the program.

The above processor 1103 may be at least one of: an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a micro-controller, a micro-processor. It can be understood that there are other electronic devices that implement functions of the above processor but the disclosure is not limited thereto.

The above computer-readable storage medium/memory may be a memory such as an ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk and a Compact Disc Read-Only Memory (CD-ROM) or may also be any terminal including one of the above memories or a combination of the above memories such as a mobile phone, a computer, a tablet device, a Personal Digital Assistant (PDA).

It should be pointed out that the descriptions of the above storage medium and the device embodiments are similar to the descriptions of the method embodiments. The above storage medium and the device embodiments bring beneficial effects similar to those brought by the method embodiments. The technical details that are not disclosed by the storage medium and the device embodiments of the disclosure can be understood with reference to the descriptions of the method embodiments of the disclosure.

It should be understood that "an embodiment" mentioned throughout the specification means that specific features, structures or characteristics related to an embodiment are included in at least one embodiment of the disclosure. Therefore, all occurrences of "in an embodiment" throughout the specification are not necessarily referred to as a same embodiment. In addition, these specific features, structures or characteristics may be combined into one or more embodiments in any proper manner. In each embodiment of the disclosure, the numbers of all the above processes do not stand for an order in which the processes are performed. The order in which the processes are performed should be determined by their functions and internal logics and should not serve as any limitation on the implementation of the embodiment of the disclosure. The numbers of the above embodiments of the disclosure are merely used for description and do not show whether they are good or bad.

It should be noted that in the present invention, terms "include", "comprise" or any of their variations is not intended to include exclusively but to cover so that processes, methods, articles or devices including a series of elements not only include the elements but also include other elements that are not explicitly listed or include their intrinsic elements. Without the presence of any other limitation, an element limited by a statement "include a(an) . . . " does not exclude a possibility that the processes, methods, articles or devices including the element also include other same elements.

It should be understood that the device and method that are disclosed in several embodiments provided in the disclosure may be implemented in other manners. The above-described device embodiments are only schematic. For example, the units are only divided according to logic functions, and may also be divided in other manners during practical implementation. For example, multiple units or components may be combined or integrated into another system, or some characteristics may be omitted or not executed. In addition, displayed or discussed coupling or direct coupling or communication connection may be indirect coupling or communication connection through some interfaces, the devices or the units, and may be electrical and mechanical or in other forms.

The above units described as separate parts may or may not be physically separated, and parts displayed as units may or may not be physical units, that is, may be located in the same place, or may also be distributed across multiple network units. A part or all of the units may be selected to achieve the purpose of the solutions of the embodiments of the disclosure according to a practical requirement.

In addition, all functional units in each embodiment of the disclosure may be integrated into a processing unit, or each unit may also serve as a separate unit, or two or more than two units may also be integrated into a unit. The above integrated unit may be implemented through a form of hardware or a combination of a hardware functional unit and a software functional unit.

Alternatively, the above integrated unit can be stored in a computer-readable storage medium if implemented in a form of the software function module and sold or used as a separate product. Based on such an understanding, an essential part of the technical solutions in embodiments of the disclosure, or a part of the technical solutions in the embodiment of the disclosure making contributions to the relevant techniques may be embodied in a form of a software product. The computer software product is stored in a storage medium and includes several instructions configured to enable an automatic line of a device to perform all or a part of the operations of the method in each embodiment of the disclosure. The foregoing storage medium includes: various media capable of storing program code such as a mobile hard disk, an ROM, a magnetic disk and an optical disk.

The methods disclosed in the several method embodiments provided in the disclosure may be combined arbitrarily to form new method embodiments if they do not bring any conflict.

The features disclosed in the several methods embodiments or device embodiments provided in the disclosure may be combined arbitrarily to form new method embodiments or device embodiments if they do not cause any conflict.

The foregoing are only implementations of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. An image processing method, comprising:
   performing feature extraction on an image to be processed through a primary image segmentation model to obtain a feature map of the image to be processed; and
   performing image segmentation on a segmentation target according to the feature map through a target image segmentation model to obtain a target segmentation result, wherein the target image segmentation model is obtained from an adversarial training with an image encoding model, and the image encoding model is used for placing a shape constraint on the target segmentation result to enable the target segmentation result to accord with prior knowledge learned by the image encoding model,
   wherein the method further comprises: before performing the image segmentation on the segmentation target according to the feature map through the target image segmentation model to obtain the target segmentation result,
      obtaining a training sample image set, wherein the training sample image set comprises at least one training sample image corresponding to the segmentation target, and the training sample image has a labeled segmentation target;
      performing the image segmentation on each of the at least one training sample image through an initial target image segmentation model to obtain a predicted segmented image; and
      performing the adversarial training of the initial target image segmentation model in combination with an initial image encoding model according to the labeled segmentation target and the predicted segmented image to obtain the target image segmentation model,
   wherein performing the adversarial training of the initial target image segmentation model in combination with the initial image encoding model according to the labeled segmentation target and the predicted segmented image to obtain the target image segmentation model comprises:
      encoding the labeled segmentation target and the predicted segmented image using the initial image encoding model to obtain a first space shape code and a second space shape code, wherein the first space shape code is a low-dimensional manifold space representation of the labeled segmentation target, and the second space shape code is a low-dimensional manifold space representation of the predicted segmented image;
      calculating a code distance between the first space shape code and the second space shape code through a preset minimum square error loss function to obtain a prediction error; and
      updating network parameters of the initial target image segmentation model based on a shape constraint of the prediction error, iterating the adversarial training process and terminating the adversarial training process until a final prediction error is less than a preset segmentation error threshold to obtain the target image segmentation model.

2. The method of claim 1, wherein the initial image encoding model comprises a decoding sub-model, and after calculating the code distance between the first space shape code and the second space shape code through the preset minimum square error loss function to obtain the prediction error, the method further comprises:
   decoding and performing image reconstruction on the first space shape code and the second space shape code respectively through the decoding sub-model to obtain a first reconstructed image and a second reconstructed image; and
   combining, through a preset reconstruction loss function, an error between the labeled segmentation target and the first reconstructed image with an error between the predicted segmented image and the second reconstructed image to obtain a reconstruction error of the initial image encoding model.

3. The method of claim 2, wherein updating the network parameters of the initial target image segmentation model based on the shape constraint of the prediction error, iterating the adversarial training process and terminating the adversarial training process until the final prediction error is less than the preset segmentation error threshold to obtain the target image segmentation model comprises:
   updating the network parameters of the initial target image segmentation model using the prediction error in an M-th training, wherein M is an integer greater than or equal to 1;

obtaining a comprehensive encoding error based on the reconstruction error and the prediction error in an (M+1)-th training;

updating the network parameters of the initial image encoding model using the comprehensive encoding error; and iterating the adversarial training process until the final prediction error is less than the preset segmentation error threshold to obtain a target encoding model and the target image segmentation model.

4. The method of claim 2, wherein the decoding sub-model comprises at least one de-convolution layer, a Rectified Linear Unit (ReLU) and a batch normalization layer.

5. The method of claim 1, wherein the initial image encoding model comprises an encoding sub-model comprising at least one convolution layer and a fully connected layer, wherein encoding the labeled segmentation target and the predicted segmented image using the initial image encoding model to obtain the first space shape code and the second space shape code comprises:

squeezing the training sample image and the predicted segmented image through the at least one convolution layer according to a preset step size of the at least one convolution layer, and encoding the labeled segmentation target in a squeezed training sample image and a squeezed predicted segmented image through the fully connected layer to obtain the first space shape code and the second space shape code.

6. The method of claim 1, wherein performing the image segmentation on the segmentation target according to the feature map through the target image segmentation model to obtain the target segmentation result comprises:

locating the segmentation target through a target locating model according to the feature map to obtain a localization result of the segmentation target; and performing the image segmentation on the segmentation target through the target image segmentation model according to the localization result to obtain the target segmentation result.

7. The method of claim 6, wherein the feature map comprises N layers of feature maps, N being an integer greater than 1, wherein locating the segmentation target through the target locating model according to the feature map to obtain the localization result comprises:

performing feature recognition and normalization processing on an N-th layer of feature map through the target locating model to obtain a probability that each pixel in the N-th layer of feature map is in a center location of the segmentation target; and performing the image segmentation on the N-th layer of feature map according to the probability to obtain the localization result of the segmentation target.

8. The method of claim 7, wherein performing the image segmentation on the segmentation target through the target image segmentation model according to the localization result to obtain the target segmentation result comprises:

predicting a shape of the segmentation target through the target image segmentation model to obtain a cropping range of the segmentation target; and performing cropping processing on the N-th layer of feature map according to the localization result of the segmentation target and the cropping range to obtain the target segmentation result.

9. The method of claim 6, further comprising: after performing the feature extraction on the image to be processed through the primary image segmentation model to obtain the feature map of the image to be processed, performing location and segmentation processing on the feature map through the primary image segmentation model according to a preset primary segmentation target to obtain a primary segmentation result corresponding to the preset primary segmentation target, wherein after performing the image segmentation on the segmentation target through the target image segmentation model according to the localization result to obtain the target segmentation result, the method further comprises:

fusing the primary segmentation result and the target segmentation result in the image to be processed to obtain an image segmentation result of the image to be processed.

10. The method of claim 1, wherein the primary image segmentation model comprises a squeeze-and-excitation (SE) module, wherein performing the feature extraction on the image to be processed through the primary image segmentation model to obtain the feature map of the image to be processed comprises:

performing down-sampling on the image to be processed twice to obtain a down-sampled image;

performing convolutional processing on the down-sampled image according to a preset convolution layer dilation rate to obtain a convolutional result;

performing residue and SE processing on the convolutional result through the SE module to obtain an excitation result; and performing multi-scale feature extraction and de-convolutional processing on the excitation result to obtain the feature map of the image to be processed.

11. An image processing device, comprising:
a memory storing processor-executable instructions; and
a processor arranged to execute the stored processor-executable instructions to perform operations of:

performing feature extraction on an image to be processed to obtain a feature map of the image to be processed; and performing image segmentation on a segmentation target according to the feature map to obtain a target segmentation result, wherein a target image segmentation model is obtained from an adversarial training with an image encoding model, and the image encoding model is used for placing a shape constraint on the target segmentation result to enable the target segmentation result to accord with prior knowledge learned by the image encoding model, wherein the processor is arranged to execute the stored processor-executable instructions to perform operations of: before performing the image segmentation on the segmentation target according to the feature map through the target image segmentation model to obtain the target segmentation result, obtaining a training sample image set, wherein the training sample image set comprises at least one training sample image corresponding to the segmentation target, and the training sample image has a labeled segmentation target;

performing the image segmentation on each of the at least one training sample image through an initial target image segmentation model to obtain a predicted segmented image; and performing the adversarial training of the initial target image segmentation model in combination with an initial image encoding model according to the labeled segmentation target and the predicted segmented image to obtain the target image segmentation model, wherein performing the adversarial training of the initial target image segmentation model in combination with the initial image encoding model according to the labeled segmentation target and the predicted segmented image to obtain the target image segmentation model comprises:

encoding the labeled segmentation target and the predicted segmented image using the initial image encoding model to obtain a first space shape code and a second space shape code, wherein the first space shape code is a low-dimensional manifold space representation of the labeled segmentation target, and the second space shape code is a low-dimensional manifold space representation of the predicted segmented image;

calculating a code distance between the first space shape code and the second space shape code through a preset minimum square error loss function to obtain a prediction error; and updating network parameters of the initial target image segmentation model based on a shape constraint of the prediction error, iterating the adversarial training process and terminating the adversarial training process until a final prediction error is less than a preset segmentation error threshold to obtain the target image segmentation model.

12. The image processing device of claim 11, wherein the initial image encoding model comprises a decoding sub-model, and wherein the processor is arranged to execute the stored processor-executable instructions to perform operations of: after calculating the code distance between the first space shape code and the second space shape code through the preset minimum square error loss function to obtain the prediction error, decoding and performing image reconstruction on the first space shape code and the second space shape code respectively through the decoding sub-model to obtain a first reconstructed image and a second reconstructed image; and combining, through a preset reconstruction loss function, an error between the labeled segmentation target and the first reconstructed image with an error between the predicted segmented image and the second reconstructed image to obtain a reconstruction error of the initial image encoding model.

13. The image processing device of claim 12, wherein updating the network parameters of the initial target image segmentation model based on the shape constraint of the prediction error, iterating the adversarial training process and terminating the adversarial training process until the final prediction error is less than the preset segmentation error threshold to obtain the target image segmentation model comprises:

updating the network parameters of the initial target image segmentation model using the prediction error in an M-th training, wherein M is an integer greater than or equal to 1;

obtaining a comprehensive encoding error based on the reconstruction error and the prediction error in an (M+1)-th training;

updating the network parameters of the initial image encoding model using the comprehensive encoding error; and iterating the adversarial training process until the final prediction error is less than the preset segmentation error threshold to obtain a target encoding model and the target image segmentation model.

14. The image processing device of claim 12, wherein the decoding sub-model comprises at least one de-convolution layer, a Rectified Linear Unit (ReLU) and a batch normalization layer.

15. The image processing device of claim 11, wherein the initial image encoding model comprises an encoding sub-model comprising at least one convolution layer and a fully connected layer, wherein encoding the labeled segmentation target and the predicted segmented image using the initial image encoding model to obtain the first space shape code and the second space shape code comprises:

squeezing the training sample image and the predicted segmented image through the at least one convolution layer according to a preset step size of the at least one convolution layer, and encoding the labeled segmentation target in a squeezed training sample image and a squeezed predicted segmented image through the fully connected layer to obtain the first space shape code and the second space shape code.

16. A non-transitory computer-readable storage medium having stored thereon computer-readable instructions that, when executed by a processor, cause the processor to perform an image processing method, the method comprising:

performing feature extraction on an image to be processed through a primary image segmentation model to obtain a feature map of the image to be processed; and performing image segmentation on a segmentation target according to the feature map through a target image segmentation model to obtain a target segmentation result, wherein the target image segmentation model is obtained from an adversarial training with an image encoding model, and the image encoding model is used for placing a shape constraint on the target segmentation result to enable the target segmentation result to accord with prior knowledge learned by the image encoding model, wherein the method further comprises: before performing the image segmentation on the segmentation target according to the feature map through the target image segmentation model to obtain the target segmentation result, obtaining a training sample image set, wherein the training sample image set comprises at least one training sample image corresponding to the segmentation target, and the training sample image has a labeled segmentation target;

performing the image segmentation on each of the at least one training sample image through an initial target image segmentation model to obtain a predicted segmented image; and performing the adversarial training of the initial target image segmentation model in combination with an initial image encoding model according to the labeled segmentation target and the predicted segmented image to obtain the target image segmentation model, wherein performing the adversarial training of the initial target image segmentation model in combination with the initial image encoding model according to the labeled segmentation target and the predicted segmented image to obtain the target image segmentation model comprises:
- encoding the labeled segmentation target and the predicted segmented image using the initial image encoding model to obtain a first space shape code and a second space shape code, wherein the first space shape code is a low-dimensional manifold space representation of the labeled segmentation target, and the second space shape code is a low-dimensional manifold space representation of the predicted segmented image;
- calculating a code distance between the first space shape code and the second space shape code through a preset minimum square error loss function to obtain a prediction error; and
- updating network parameters of the initial target image segmentation model based on a shape constraint of the prediction error, iterating the adversarial training process and terminating the adversarial training process until a final prediction error is less than a preset segmentation error threshold to obtain the target image segmentation model.

17. The non-transitory computer-readable storage medium of claim 16, wherein the initial image encoding model comprises a decoding sub-model, and after calculating the code distance between the first space shape code and the second space shape code through the preset minimum square error loss function to obtain the prediction error, the method further comprises:
- decoding and performing image reconstruction on the first space shape code and the second space shape code respectively through the decoding sub-model to obtain a first reconstructed image and a second reconstructed image; and
- combining, through a preset reconstruction loss function, an error between the labeled segmentation target and the first reconstructed image with an error between the predicted segmented image and the second reconstructed image to obtain a reconstruction error of the initial image encoding model.

18. The non-transitory computer-readable storage medium of claim 17, wherein updating the network parameters of the initial target image segmentation model based on the shape constraint of the prediction error, iterating the adversarial training process and terminating the adversarial training process until the final prediction error is less than the preset segmentation error threshold to obtain the target image segmentation model comprises:
- updating the network parameters of the initial target image segmentation model using the prediction error in an M-th training, wherein M is an integer greater than or equal to 1;
- obtaining a comprehensive encoding error based on the reconstruction error and the prediction error in an (M+1)-th training;
- updating the network parameters of the initial image encoding model using the comprehensive encoding error; and
- iterating the adversarial training process until the final prediction error is less than the preset segmentation error threshold to obtain a target encoding model and the target image segmentation model.

19. The non-transitory computer-readable storage medium of claim 17, wherein the decoding sub-model comprises at least one de-convolution layer, a Rectified Linear Unit (ReLU) and a batch normalization layer.

20. The non-transitory computer-readable storage medium of claim 16, wherein the initial image encoding model comprises an encoding sub-model comprising at least one convolution layer and a fully connected layer,
- wherein encoding the labeled segmentation target and the predicted segmented image using the initial image encoding model to obtain the first space shape code and the second space shape code comprises:
  - squeezing the training sample image and the predicted segmented image through the at least one convolution layer according to a preset step size of the at least one convolution layer, and encoding the labeled segmentation target in a squeezed training sample image and a squeezed predicted segmented image through the fully connected layer to obtain the first space shape code and the second space shape code.

* * * * *